(12) United States Patent
Zhou et al.

(10) Patent No.: US 11,906,886 B2
(45) Date of Patent: Feb. 20, 2024

(54) DISPLAY MODULE AND DISPLAY SYSTEM

(71) Applicant: WUHAN CHINA STAR OPTOELECTRONICS TECHNOLOGY CO., LTD., Wuhan (CN)

(72) Inventors: Zheng Zhou, Wuhan (CN); Suimang Song, Wuhan (CN)

(73) Assignee: WUHAN CHINA STAR OPTOELECTRONICS TECHNOLOGY CO., LTD., Wuhan (CN)

( * ) Notice: Subject to any disclaimer, the term of this patent is extended or adjusted under 35 U.S.C. 154(b) by 303 days.

(21) Appl. No.: 17/289,044

(22) PCT Filed: Mar. 31, 2021

(86) PCT No.: PCT/CN2021/084596
§ 371 (c)(1),
(2) Date: Apr. 27, 2021

(87) PCT Pub. No.: WO2022/198708
PCT Pub. Date: Sep. 29, 2022

(65) Prior Publication Data
US 2023/0146381 A1    May 11, 2023

(30) Foreign Application Priority Data
Mar. 25, 2021 (CN) .......................... 202110318206.9

(51) Int. Cl.
*G03B 21/00* (2006.01)
*G02F 1/1333* (2006.01)
*G02F 1/13357* (2006.01)

(52) U.S. Cl.
CPC ..... *G03B 21/006* (2013.01); *G02F 1/133314* (2021.01); *G02F 1/133603* (2013.01); *G02F 1/133605* (2013.01); *G02F 1/133606* (2013.01); *G02F 1/133608* (2013.01)

(58) Field of Classification Search
CPC ......... G02F 1/133314; G02F 1/133603; G02F 1/133605; G02F 1/133606; G02F 1/133608
USPC ............................................ 349/5–11, 74–75
See application file for complete search history.

(56) References Cited

U.S. PATENT DOCUMENTS

2012/0262634 A1    10/2012  Takano
2017/0371093 A1*   12/2017  Fan ...................... G02B 6/0088

FOREIGN PATENT DOCUMENTS

| CN | 1582077   A | 2/2005 |
| CN | 102621741 A | 8/2012 |
| CN | 102625633 A | 8/2012 |
| CN | 106094333 A | 11/2016 |

(Continued)

*Primary Examiner* — Charles S Chang
(74) *Attorney, Agent, or Firm* — The Roy Gross Law Firm, LLC; Roy Gross

(57) ABSTRACT

A display system includes a display module, a projection component, and a projection bearing component. The projection component is disposed with respect to a display side defined by a second liquid crystal panel. The projection bearing component is disposed with respect to a side of the projection component away from the display module. The projection component is configured to project a display image of the second liquid crystal panel onto the projection bearing component.

17 Claims, 5 Drawing Sheets

(56) References Cited

FOREIGN PATENT DOCUMENTS

| | | | |
|---|---|---|---|
| CN | 108490613 A | 9/2018 | |
| CN | 208189145 U | 12/2018 | |
| CN | 111751994 A | 10/2020 | |
| CN | 212647211 * | 3/2021 | ........... G02F 1/1333 |
| CN | 212647211 U | 3/2021 | |
| CN | 213659145 U | 7/2021 | |
| IN | 206209146 U | 5/2017 | |
| KR | 20110077333 A | 7/2011 | |
| WO | 2019184335 A1 | 10/2019 | |

* cited by examiner

DISPLAY MODULE AND DISPLAY SYSTEM

CROSS REFERENCE TO RELATED APPLICATIONS

This application is a National Phase of PCT Patent Application No. PCT/CN2021/084596 having International filing date of Mar. 31, 2021, which claims the benefit of priority of Chinese Application No. 202110318206.9 filed Mar. 25, 2021. The contents of the above applications are all incorporated by reference as if fully set forth herein in their entirety.

BACKGROUND OF INVENTION

1. Field of Invention

The present application relates to a technical field of displays, and particularly to a display module and a display system.

2. Related Art

The inventor of the present application found that in the research and practice of prior art, general in-vehicle displays are all single-sided displays. With development of display technologies and changes in market demands, applications of single-sided displays have certain limitation. Due to sizes of display interfaces being limited, the display interfaces cannot display an enormous amount of image data and text information, or cannot present information about two different application scenarios, etc., at the same time.

SUMMARY OF INVENTION

An object of the present application is to provide a display module and a display system to perform double-sided display and to increase an amount of display information.

An embodiment of the present application provides a display module, comprising a back frame comprising a backplane, a first side wall, and a second side wall, wherein the backplane comprises a first surface and a second surface disposed opposite to each other, the first side wall is disposed on the first surface and located on a peripheral side of the backplane, the second side wall is disposed on the second surface and located on a peripheral side of the backplane, the first side wall and the backplane collectively allow for formation of a first groove, and the second side wall and the backplane collectively allow for formation of a second groove; a first backlight module disposed in the first groove; a second backlight module disposed in the second groove; a first frame disposed on a side of the first side wall away from the backplane; a second frame disposed on a side of the second side wall away from the backplane; a first liquid crystal panel provided on a side of the first frame away from the backplane; and a second liquid crystal panel provided on a side of the second frame away from the backplane.

Optionally, in some embodiments of the present application, the first frame and the second frame are spaced apart by a spacing.

Optionally, in some embodiments of the present application, the first frame comprises a third side wall and a first support portion, the third side wall is mounted on an outer peripheral surface of the first side wall, and the first support portion extends from the third side wall in a direction from the first side wall to a center line of the first groove; wherein a third groove is defined on a side of the first support portion away from the backplane, and the first liquid crystal panel is disposed in the third groove.

Optionally, in some embodiments of the present application, the second frame comprises a fourth side wall and a second support portion, the fourth side wall is mounted on an outer peripheral surface of the second side wall, and the second support portion extends from the fourth side wall in a direction from the second side wall to a center line of the second groove; wherein a fourth groove is defined on a side of the second support portion away from the backplane, and the second liquid crystal panel is disposed in the fourth groove.

Optionally, in some embodiments of the present application, the display module further comprises a first light-shielding adhesive and a second light-shielding adhesive, wherein the first light-shielding adhesive is disposed in the third groove and located between the first support portion and the first liquid crystal panel, and the second light-shielding adhesive is disposed in the fourth groove and located between the second support portion and the second liquid crystal panel.

Optionally, in some embodiments of the present application, the first backlight module comprises a reflective sheet, a light guide plate, a first optical film, and a light source; wherein the reflective sheet is disposed on the first surface, the light guide plate is disposed on a side of the reflective sheet away from the first surface, the first optical film is disposed on a light output surface defined on the light guide plate, and the light source is arranged on the first side wall facing a light input surface defined on the light guide plate.

Optionally, in some embodiments of the present application, the first side wall comprises a corner portion having a first notch, and the first optical film comprises a first optical film body and a first positioning portion connected to a corner of the first optical film body; wherein the first optical film body is disposed in the first groove, and the first positioning portion passes through and is engaged with the first notch.

Optionally, in some embodiments of the present application, the first notch has an opening area gradually increasing from a side of the first notch close to the first groove to a side of the first notch away from the first groove, and the first positioning portion has a width gradually increasing from a side of the first positioning portion connected to the first optical film body to a side of the first positioning portion away from the first optical film body, so that the first positioning portion is engaged with the first notch.

Optionally, in some embodiments of the present application, a first engaging portion is arranged on an outer peripheral side of the first side wall, a first engaging recess is defined on the third side wall, and the first engaging portion engages with the first engaging recess.

Optionally, in some embodiments of the present application, a first insertion portion is disposed on a side of the first side wall facing the first support portion, a first insertion slot is defined on the first support portion, and the first insertion portion is inserted in the first insertion slot.

Optionally, in some embodiments of the present application, the second backlight module comprises a light-emitting diode (LED) light board, a holding member, a diffuser plate, and a second optical film; wherein the LED light board is disposed on the second surface, the holding member is disposed on a peripheral side of the LED light board, a fifth groove is defined on a side of the holding member away from the second surface, and the diffuser plate is disposed on a light output side of the LED light board, wherein part of the diffuser plate is located in the fifth groove, and the second optical film is disposed on a side of the diffuser plate away from the backplane.

Correspondingly, an embodiment of the present application further provides a display system, comprising a display module of the above-mentioned embodiments; wherein the display module comprises a back frame comprising a backplane, a first side wall, and a second side wall, wherein the backplane comprises a first surface and a second surface disposed opposite to each other, the first side wall is disposed on the first surface and located on a peripheral side of the backplane, the second side wall is disposed on the second surface and located on a peripheral side of the backplane, the first side wall and the backplane collectively allow for formation of a first groove, and the second side wall and the backplane collectively allow for formation of a second groove; a first backlight module disposed in the first groove; a second backlight module disposed in the second groove; a first frame disposed on a side of the first side wall away from the backplane; a second frame disposed on a side of the second side wall away from the backplane; a first liquid crystal panel provided on a side of the first frame away from the backplane; and a second liquid crystal panel provided on a side of the second frame away from the backplane; a projection component disposed with respect to a display side defined by the second liquid crystal panel, wherein a display surface defined on the second liquid crystal panel is located at an angle with respect to a plane on which the projection component is situated, wherein the angle is an acute angle, and a projection bearing component is disposed with respect to a light output side defined by the projection component, and the projection component is configured to project a display image of the second liquid crystal panel onto the projection bearing component.

Optionally, in some embodiments of the present application, the projection component comprises a reflective surface being concave curved in shape.

Optionally, in some embodiments of the present application, the display system is applied to an in-vehicle display, and the projection bearing component is a front windshield.

Optionally, in some embodiments of the present application, the first frame comprises a third side wall and a first support portion, the third side wall is mounted on an outer peripheral surface of the first side wall, and the first support portion extends from the third side wall in a direction from the first side wall to a center line of the first groove; wherein a third groove is defined on a side of the first support portion away from the backplane, and the first liquid crystal panel is disposed in the third groove.

Optionally, in some embodiments of the present application, the display module further comprises a first light-shielding adhesive disposed in the third groove and located between the first support portion and the first liquid crystal panel.

Optionally, in some embodiments of the present application, the first backlight module comprises a reflective sheet, a light guide plate, a first optical film, and a light source; wherein the reflective sheet is disposed on the first surface, the light guide plate is disposed on a side of the reflective sheet away from the first surface, the first optical film is disposed on a light output surface defined on the light guide plate, and the light source is arranged on the first side wall facing a light input surface defined on the light guide plate.

Optionally, in some embodiments of the present application, the first side wall comprises a corner portion having a first notch, and the first optical film comprises a first optical film body and a first positioning portion connected to a corner of the first optical film body; wherein the first optical film body is disposed in the first groove, and the first positioning portion passes through and is engaged with the first notch Optionally, in some embodiments of the present application, the first notch has an opening area gradually increasing from a side of the first notch close to the first groove to a side of the first notch away from the first groove, and the first positioning portion has a width gradually increasing from a side of the first positioning portion connected to the first optical film body to a side of the first positioning portion away from the first optical film body, so that the first positioning portion is engaged with the first notch.

The present application has advantageous effects as follows: the display module of the display system of the embodiment utilizes the structure of one back frame to include the first backlight module and the second backlight module, thereby saving space and thinning the display module, as well as achieving a function of double-sided display of the display module.

BRIEF DESCRIPTION OF DRAWINGS

In order to more clearly describe the technical solutions in the embodiments of the present application, the following will briefly introduce the drawings that need to be used in the description of the embodiments. Apparently, the drawings in the following description are only certain embodiments of the application. For those skilled in the art, other drawings can be obtained based on these drawings without creative work.

DESCRIPTION OF PREFERRED EMBODIMENTS

Figure 1:
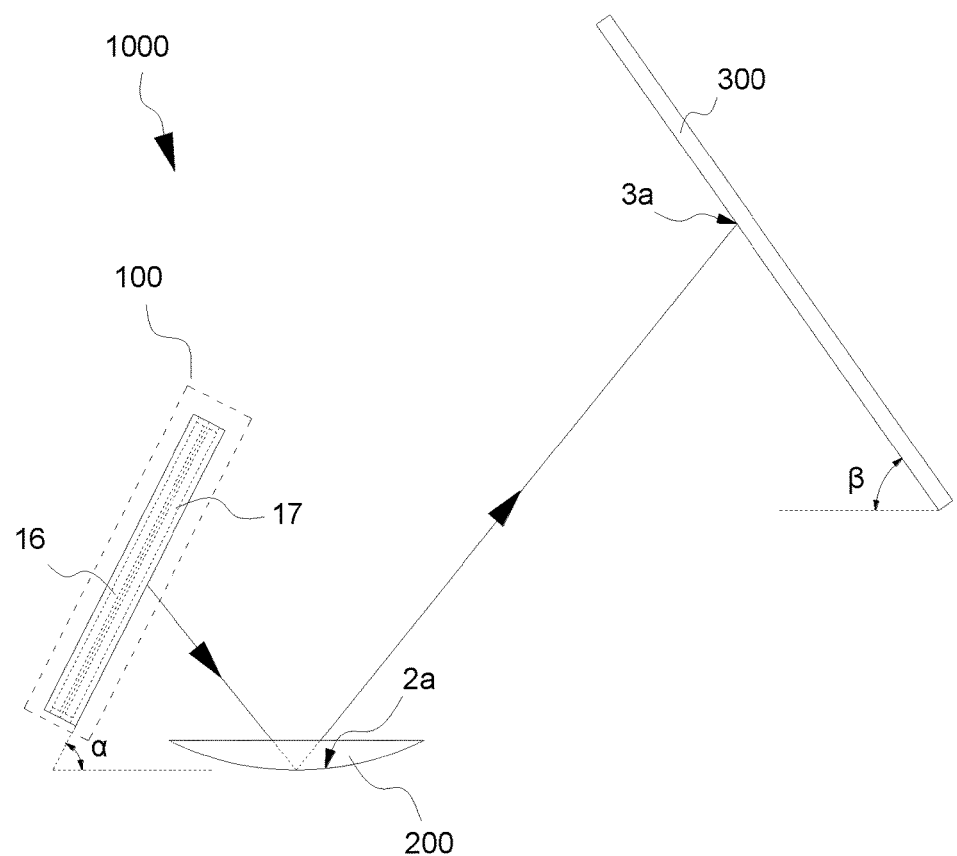
FIG. 1 is a schematic structural view of a display system provided by an embodiment of the present application.

The following will clearly and completely describe the technical solutions in the embodiments of the present application with reference to the drawings in the embodiments of the present application. Obviously, the described embodiments are only a part of the embodiments of the present application, rather than all the embodiments. Based on the embodiments in this application, all other embodiments obtained by those skilled in the art without creative work shall fall within the protection scope of this application. In addition, it should be understood that the specific implementations described here are only used to illustrate and explain the application, and are not used to limit the application. In this application, unless otherwise stated, the directional words used such as "upper" and "lower" generally refer to the upper and lower directions of the device in actual use or working state, and specifically refer to the drawing directions in the drawings, while "inner" and "outer" refer to the profile of the device.

An embodiment of the present application provides a display module 100 and a display system 1000, and the detailed description is given below.

Please refer to FIG. 1. An embodiment of the present application further provides a display system 1000 including a display module 100, a projection component 200, and a projection bearing component 300.

Figure 2:
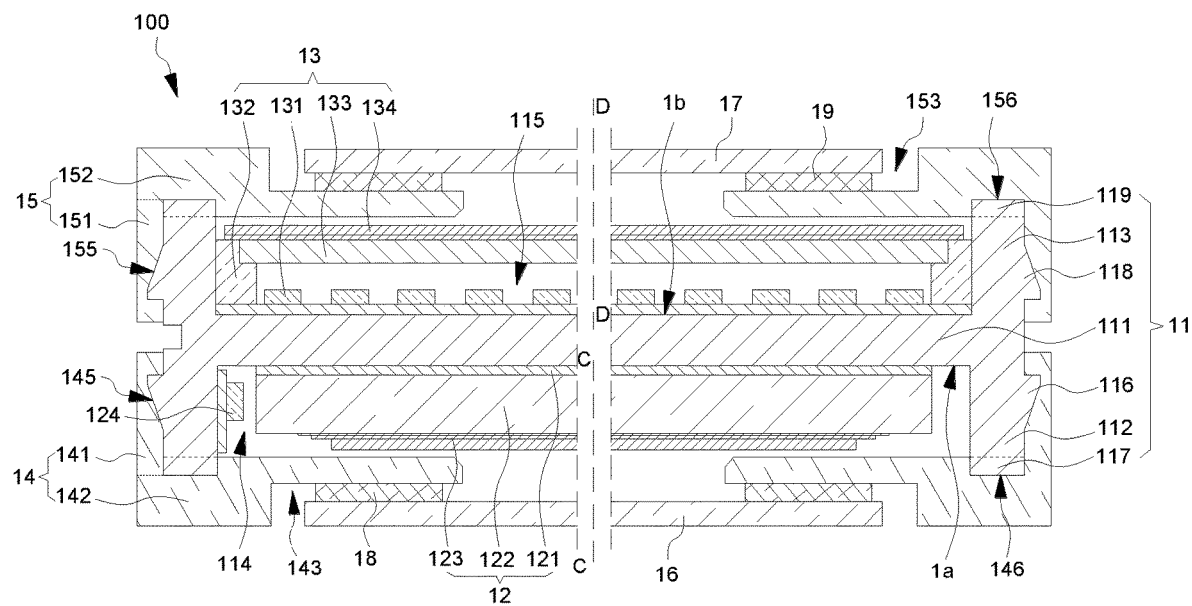
FIG. 2 is a schematic structural view of a display module of the display system provided by the embodiment of the present application

Please refer to FIG. 2. The display module 100 includes a back frame 11, a first backlight module 12, a second backlight module 13, a first frame 14, a second frame 15, a first liquid crystal panel 16, and a second liquid crystal panel 17.

The back frame 11 includes a backplane 111, a first side wall 112, and a second side wall 113. The backplane 111 includes a first surface 1a and a second surface 1b disposed opposite to each other. The first side wall 112 is disposed on the first surface 1a and located on a peripheral side of the backplane 111. The second side wall 113 is disposed on the second surface 1b and located on a peripheral side of the backplane 111. The first side wall 112 and the backplane 111 collectively form a first groove 114. The second side wall 113 and the backplane 111 collectively form a second groove 115.

Specifically, each of the first side wall 112 and the second side wall 113 is arranged to extend in a direction along peripheral sides of the backplane 111, so as to form an enclosed structure.

The first backlight module 12 is disposed in the first groove 114. The second backlight module 13 is disposed in the second groove 115. The first frame 14 is disposed on a side of the first side wall 112 away from the backplane 111. The second frame 15 is disposed on a side of the second side wall 113 away from the backplane 111.

The first liquid crystal panel 16 is provided on a side of the first frame 14 away from the backplane 111. The second liquid crystal panel 17 is provided on a side of the second frame 15 away from the backplane 111.

Please refer to FIG. 1. The projection component 200 is disposed with respect to a display side defined by the second liquid crystal panel 17. A display surface defined on the second liquid crystal panel 17 is located at an angle α with respect to a plane on which the projection component 200 is situated. The angle α is an acute angle.

The projection bearing component 300 is disposed with respect to a light output side defined by the projection component 200 and is located on a side away from the display module 100 with respect to the projection component 200.

Specifically, the projection component 200 is configured to project a display image presented by the second liquid crystal panel 17 onto the projection bearing component 300, so that users can see information displayed by the second liquid crystal panel 17 on the projection bearing component 300.

Therefore, the display system 1000 of this embodiment realizes a function of dual display in a limited space. Optionally, the first liquid crystal panel 16 can display basic functions, such as displaying information about entertainment and navigation. The second liquid crystal panel 17 can display auxiliary functions, such as displaying chat information, and information such as weather, time, and more.

In addition, the display module 100 of the display system 1000 of this embodiment utilizes the structure of one back frame 11 to include the first backlight module 12 and the second backlight module 13, thereby saving space and thinning the display module 100, as well as achieving a function of double-sided display of the display module 100.

Optionally, the setting of the angle α as an acute angle can reduce installation space and facilitate the second liquid crystal panel 17 to project the display image onto the projection component 200. Preferably, the angle α may be 15 degrees, 30 degrees, 45 degrees, 60 degrees, or 75 degrees.

In some embodiments, the angle α may also be a right angle or an obtuse angle. For example, it may be 100 degrees, 120 degrees, 130 degrees, or 150 degrees.

The projection component 200 includes a reflective surface 2a being concave curved in shape. The curved reflective surface 2a can achieve an effect of deflecting incident light in a direction relatively away from a center of a projection surface 3a defined on the projection bearing component 300, so that a problem that a center area of an image is too bright and corners are dark can be prevented, thereby improving uniformity of image brightness.

It should be noted that the projection surface 3a of the projection bearing component 300 is a bearing surface bearing a display image which is being reflected.

In some embodiments, the reflective surface 2a may also be a flat surface.

In some embodiments, the projection component 200 may also be a component with a light refraction function. Optionally, the projection component 200 is made of a light-transmissive material.

Optionally, the projection bearing component 300 is inclined toward the display module 100, so as to shorten a distance between the projection surface of the projection bearing component 300 and users.

Optionally, the projection bearing component 300 is located at an inclination angle β, which is an acute angle. The inclination angle β may be 15 degrees, 30 degrees, 45 degrees, 60 degrees, or 75 degrees.

It should be noted that the inclination angle β is an angle formed between the projection surface 3a and a plane parallel with a plane where the projection component 200 is located on.

Optionally, the display system 1000 of this embodiment is applied to an in-vehicle display, and the projection bearing component 300 is a front windshield. Certainly, the display system 1000 of this embodiment may also be applied to other display scenarios, such as a display scenario of ship piloting, a display scenario of monitoring and tracking, and so on.

Optionally, the projection surface of the projection bearing component 300 is disposed to intersect with the display module 100 in an extending direction in order to facilitate viewing of display information presented on the projection bearing component 300.

Optionally, the projection surface of the projection bearing component 300 is located higher than the display module 100, so that users can view the display information on the projection surface in a safer way while driving the vehicle.

Please refer to FIG. 2. The first frame 14 and the second frame 15 are spaced apart by a spacing, which serves to prevent the first frame 14 and the second frame 15 from interfering with each other during assembly.

Optionally, the spacing has a width greater than or equal to 0.5 millimeters (mm), such as 0.5 mm, 1 mm, 2 mm, or 5 mm.

The first frame 14 includes a third side wall 141 and a first support portion 142. The third side wall 141 is mounted on an outer peripheral surface of the first side wall 112. The first support portion 142 extends from the third side wall 141 in a direction from the first side wall 112 to a center line CC of the first groove 114.

A third groove 143 is defined on a side of the first support portion 142 away from the backplane 111. The first liquid crystal panel 16 is disposed in the third groove 143, so that the display module 100 can be thinned, and stability of the assembly of the first liquid crystal panel 16 can be improved. The third groove 143 spatially communicates with the first groove 114.

The second frame 15 includes a fourth side wall 151 and a second support portion 152. The fourth side wall 151 is mounted on an outer peripheral surface of the second side wall 113, and the second support portion 152 extends from the fourth side wall 151 in a direction from the second side wall 113 to a center line DD of the second groove 115.

A fourth groove 153 is defined on a side of the second support portion 152 away from the backplane 111. The second liquid crystal panel 17 is disposed in the fourth groove 153, so that the display module 100 can be thinned, and stability of the assembly of the second liquid crystal panel 17 can be improved. The fourth groove 153 spatially communicates with the second groove 115.

The display module 100 further includes a first light-shielding adhesive 18 and a second light-shielding adhesive 19. The first light-shielding adhesive 18 is disposed in the third groove 143 and located between the first support portion 142 and the first liquid crystal panel 16, so as to fix the first support portion 142 and the first liquid crystal panel 16, as well as reduce the risk of light leakage of the first backlight module 12.

The second light-shielding adhesive 19 is disposed in the fourth groove 153 and located between the second support portion 152 and the second liquid crystal panel 17, so as to fix the second support portion 152 and the second liquid crystal panel 17, as well as reduce the risk of light leakage of the second backlight module 13.

Optionally, a material of the first light-shielding adhesive 18 and the second light-shielding adhesive 19 may be foam adhesive.

In the display system 1000 of this embodiment, the first backlight module 12 may be an edge-lit backlight or a direct-type backlight. In this embodiment, the first backlight module 12 is an edge-lit backlight as an example for description.

The first backlight module 12 includes a reflective sheet 121, a light guide plate 122, a first optical film 123, and a light source 124.

The reflective sheet 121 is disposed on the first surface 1a. The light guide plate 122 is disposed on a side of the reflective sheet 121 away from the first surface 1a. The first optical film 123 is disposed on a light output surface defined on the light guide plate 122, and the light source 124 is arranged on the first side wall 112 facing a light input surface defined on the light guide plate 122.

Figure 3:
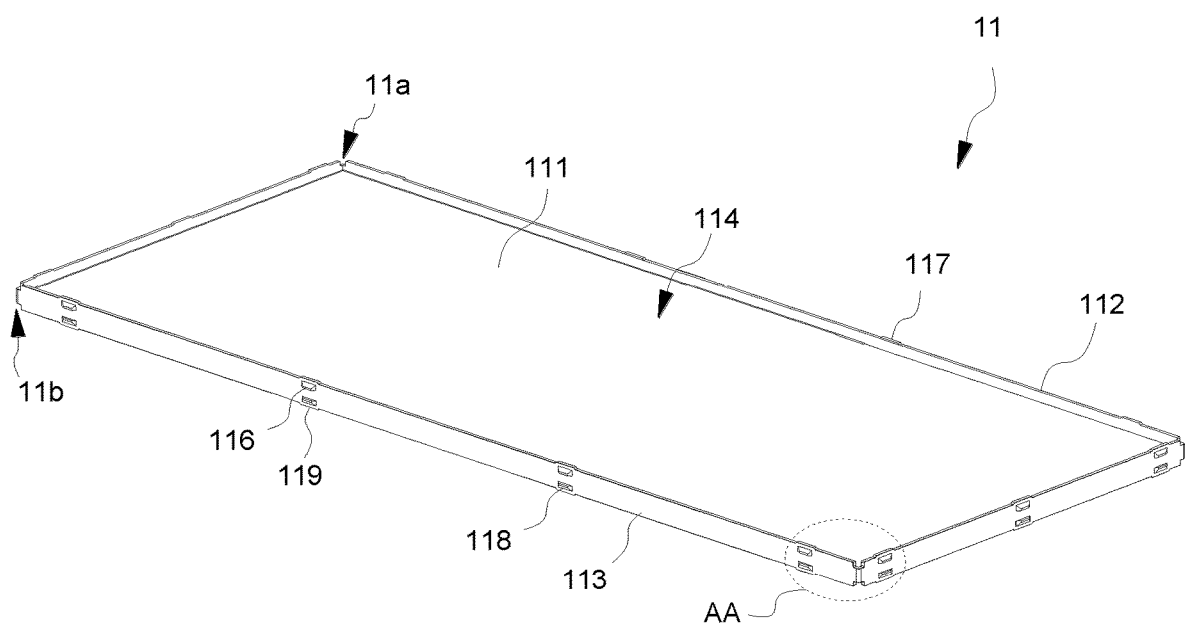
FIG. 3 is a schematic structural view of a back frame of the display system at a first viewing angle provided by the embodiment of the present application.
Figure 4:
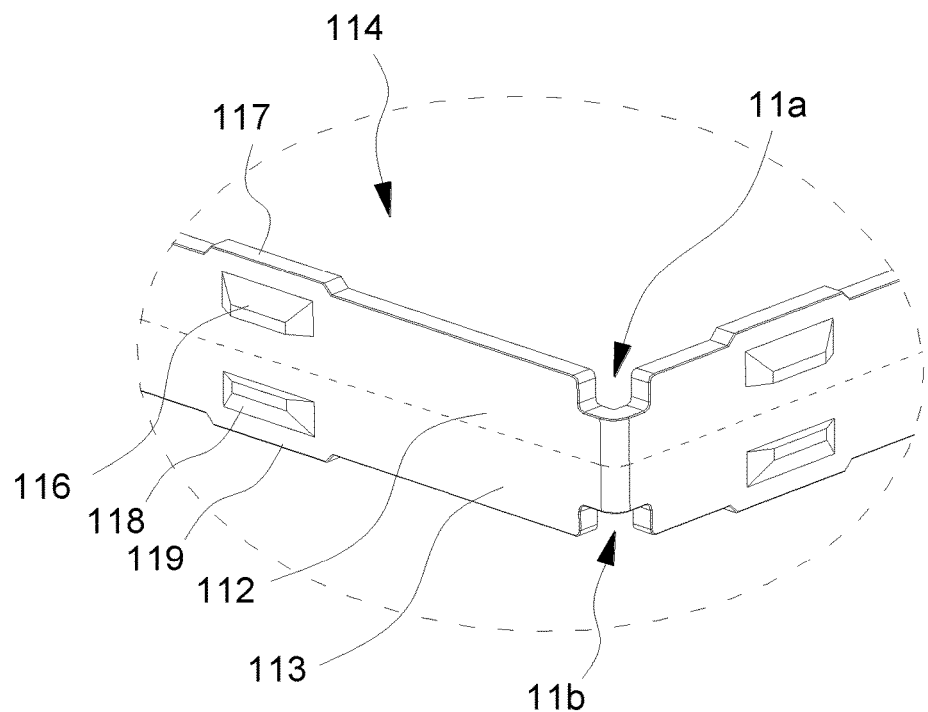
FIG. 4 is an enlarged view of a dot-circled portion AA in FIG. 3.
Figure 5:
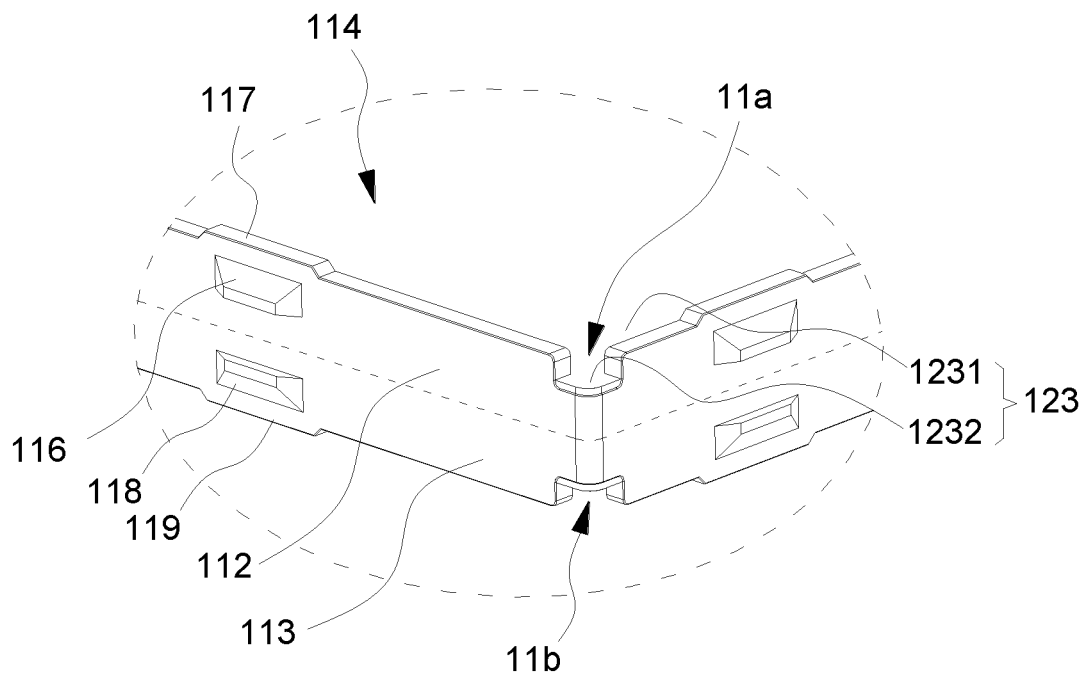
FIG. 5 is a schematic partial structural view showing a first optical film assembled with the back frame of the display system provided by the embodiment of the present application.

Please refer to FIGS. 3 to 5. The first side wall 112 has a corner portion having a first notch 11a. The first optical film 123 includes a first optical film body 1231 and a first positioning portion 1232 connected to a corner of the first optical film body 1231.

The first optical film body 1231 is disposed in the first groove 114. The first positioning portion 1232 passes through and is engaged with the first notch 11a.

Specifically, the first notch 11a has an opening area gradually increasing from a side of the first notch 11a close to the first groove 114 to a side of the first notch away from the first groove 114.

The first positioning portion 1232 has a width gradually increasing from a side of the first positioning portion connected to the first optical film body 1231 to a side of the first positioning portion away from the first optical film body 1231. In this manner, the first positioning portion 1232 is engaged with the first notch 11a.

This embodiment reduces the risk of displacement of the first optical film 123 during transportation or vibration through snap engagement between the first positioning portion 1232 and the first notch 11a.

Figure 6:
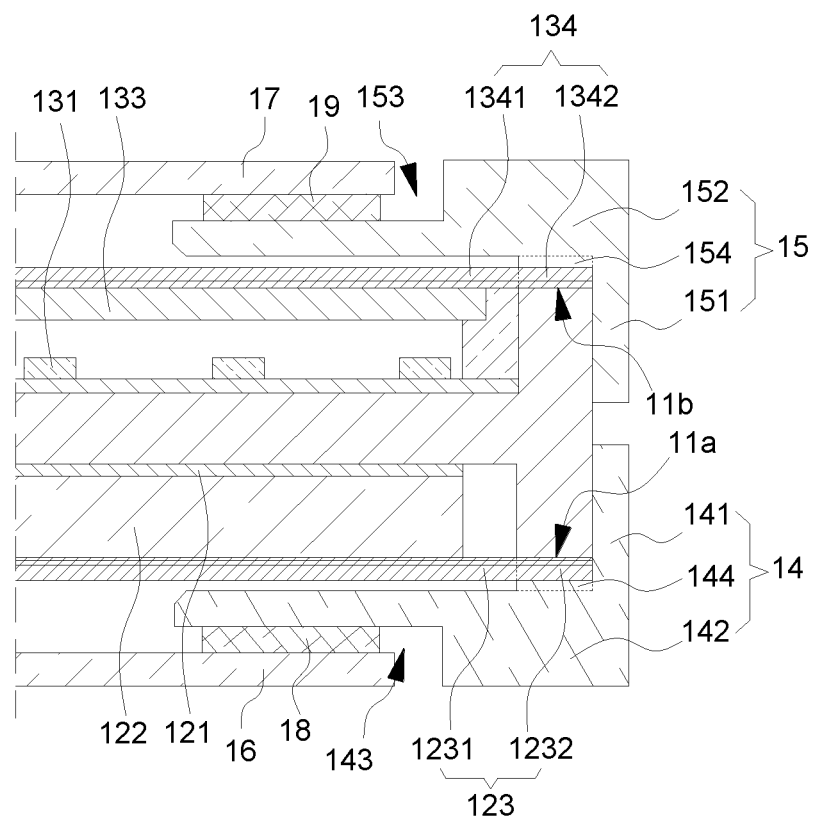
FIG. 6 is a schematic cross-sectional view of the display module of the display system in a corner portion provided by the embodiment of the present application.
Figure 7:
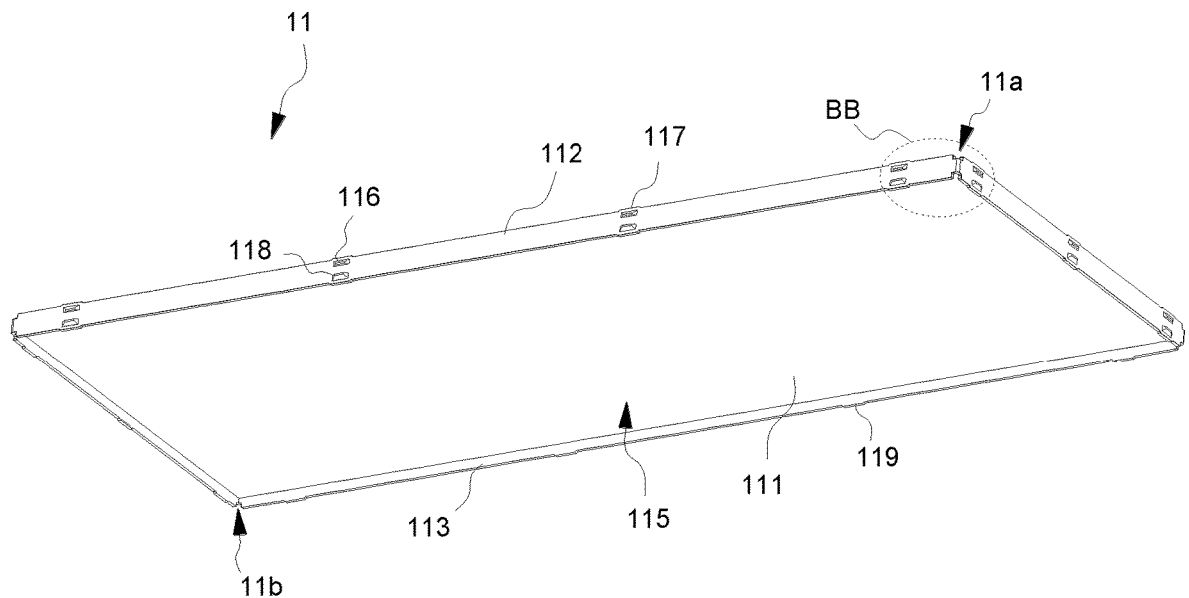
FIG. 7 is a schematic structural view of the back frame of the display system at a second viewing angle provided by the embodiment of the present application.
Figure 8:
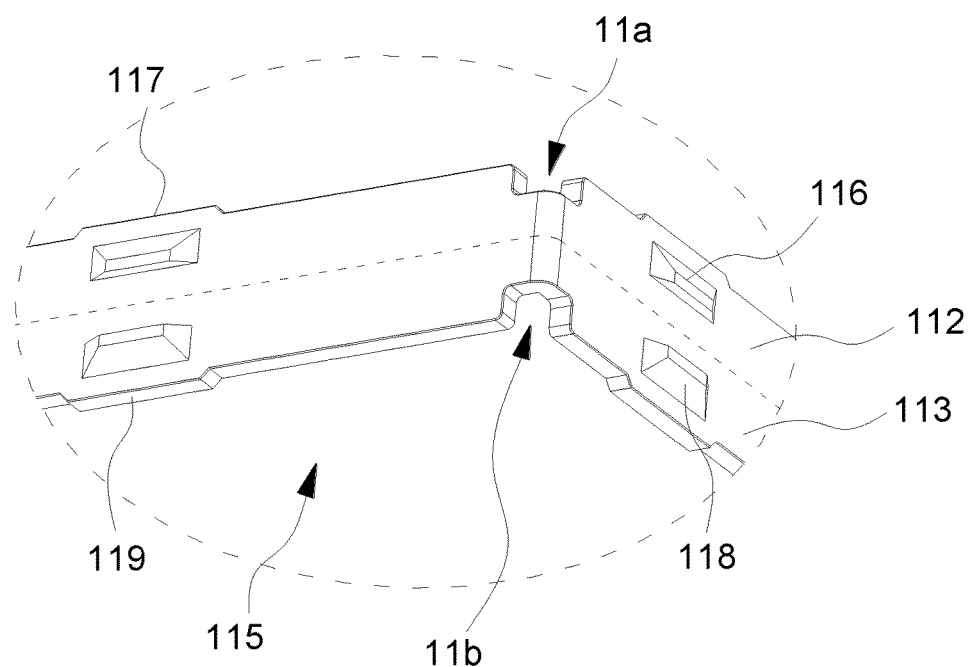
FIG. 8 is an enlarged view of a dot-circled portion BB in FIG. 7.
Figure 9:
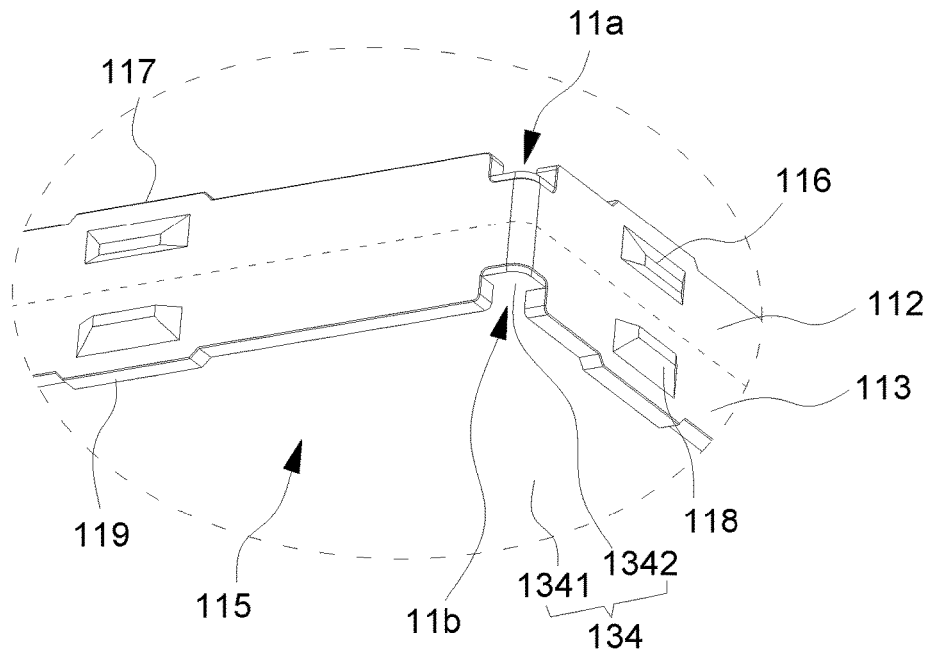
FIG. 9 is a schematic partial structural view showing a second optical film assembled with the back frame of the display system provided by the embodiment of the present application.

Please refer to FIG. 6. The first frame 14 includes a first pressing portion 144 disposed at a corner of the first support portion 142. The first pressing portion 144 is provided in the first notch 11a and presses the first positioning portion 1232 to reduce the risk of displacement of the first optical film 123.

Please refer to FIGS. 2 to 4. A first engaging portion 116 is arranged on an outer peripheral side of the first side wall 112. A first engaging recess 145 is defined on the third side wall 141. The first engaging portion 116 engages with the first engaging recess 145, so as to improve stability of the assembly of the first frame 14 and the back frame 11.

Optionally, the first engaging portions 116 are arranged at intervals in a direction along the peripheral side of the first side wall 112. The number of each of the first engaging portion 116 and the first engaging recess 145 is plural, and the they are disposed in a one-to-one arrangement to improve the stability of the assembly.

A first insertion portion 117 is disposed on a side of the first side wall 112 facing the first support portion 142. A first insertion slot 146 is defined on the first support portion 142, and the first insertion portion 117 is inserted in the first insertion slot 146.

When the first frame 14 and the back frame 11 are assembled, the first side wall 112 is prone to deformation due to a thin thickness of the first side wall 112. As a result, in this embodiment, the first insertion portion 117 and the first insertion slot 146 are configured to be adapted to each other, so as to reduce the risk of deformation of the first side wall 112.

Optionally, number of each of the first insertion portion 117 and the first insertion slot 146 is plural, and they are disposed in a one-to-one arrangement.

Optionally, the back frame 11 is an integrally formed structure. The back frame 11 is made of a material with a relatively high thermal conductivity, such as aluminum metal, titanium alloy, or ceramic material, so as to improve heat dissipation efficiency of the back frame 11.

Optionally, In the display system 1000 of this embodiment, the second backlight module 13 may be an edge-lit backlight or a direct-type backlight. In this embodiment, the second backlight module 13 is a direct-type backlight as an example for description.

The direct-type second backlight module 13 provides a high-brightness surface light source for the second liquid crystal panel 17, and realizes a function of regional display of the second liquid crystal panel 17.

The second backlight module 13 includes a light-emitting diode (LED) light board 131, a holding member 132, a diffuser plate 133, and a second optical film 134.

The LED light board 131 is disposed on the second surface 1b. The holding member 132 is disposed on a peripheral side of the LED light board 131. A fifth groove 135 is defined on a side of the holding member 132 away from the second surface 1b. The diffuser plate 133 is disposed on a light output side of the LED light board 131, wherein part of the diffuser plate 133 is located in the fifth groove 135. The second optical film 134 is disposed on a side of the diffuser plate 133 away from the backplane 111.

Please refer to FIGS. 6 to 9. The second side wall 113 has a corner portion having a second notch 11b. The second optical film 134 includes a second optical film body 1341 and a second positioning portion 1342 connected to a corner of the second optical film body 1341.

The second optical film body 1341 is disposed in the second groove 115. The second positioning portion 1342 passes through and is engaged with the second notch 11b.

Specifically, the second notch 11b has an opening area gradually increasing from a side of the second notch close to the second groove 115 to a side of the second notch away from the second groove 115.

The second positioning portion 1342 has a width gradually increasing from a side of the second positioning portion connected to the second optical film body 1341 to a side of the second positioning portion away from the second optical film body 1342. In this manner, the second positioning portion 1342 is engaged with the second notch 11b.

This embodiment reduces the risk of displacement of the second optical film 134 during transportation or vibration through snap engagement between the second positioning portion 1342 and the second notch 11b.

Please refer to FIG. 6. The second frame 15 includes a second pressing portion 154 disposed at a corner of the second support portion 152. The second pressing portion 154 is provided in the second notch 11b and presses the second positioning portion 1342 to reduce the risk of displacement of the second optical film 134.

Please refer to FIG. 2. A second engaging portion 118 is arranged on an outer peripheral side of the second side wall 113. A second engaging recess 155 is defined on the fourth side wall 151. The second engaging portion 118 engages with the second engaging recess 155, so as to improve stability of the assembly of the second frame 15 and the back frame 11.

Optionally, the second engaging portions 118 are arranged at intervals in a direction along the peripheral side of the second side wall 113. Number of each of the second engaging portion 118 and the second engaging recess 155 is plural, and the they are disposed in a one-to-one arrangement to improve the stability of the assembly.

A second insertion portion 119 is disposed on a side of the second side wall 113 facing the second support portion 152. A second insertion slot 156 is defined on the second support portion 152, and the second insertion portion 119 is inserted in the second insertion slot 156.

When the second frame 15 and the back frame 11 are assembled, the second side wall 113 is prone to deformation due to a thin thickness of the second side wall 113. As a result, in this embodiment, the second insertion portion 119 and the second insertion slot 156 are configured to be adapted to each other, so as to reduce the risk of deformation of the second side wall 113.

Optionally, number of each of the second insertion portion 119 and the second insertion slot 156 is plural, and they are disposed in a one-to-one arrangement.

Optionally, the first engaging portion 116, the first insertion portion 117, the second engaging portion 118, and the second insertion portion 119 are disposed in parallel arrangement in a direction of the thickness of the display module 100.

Figure 10:
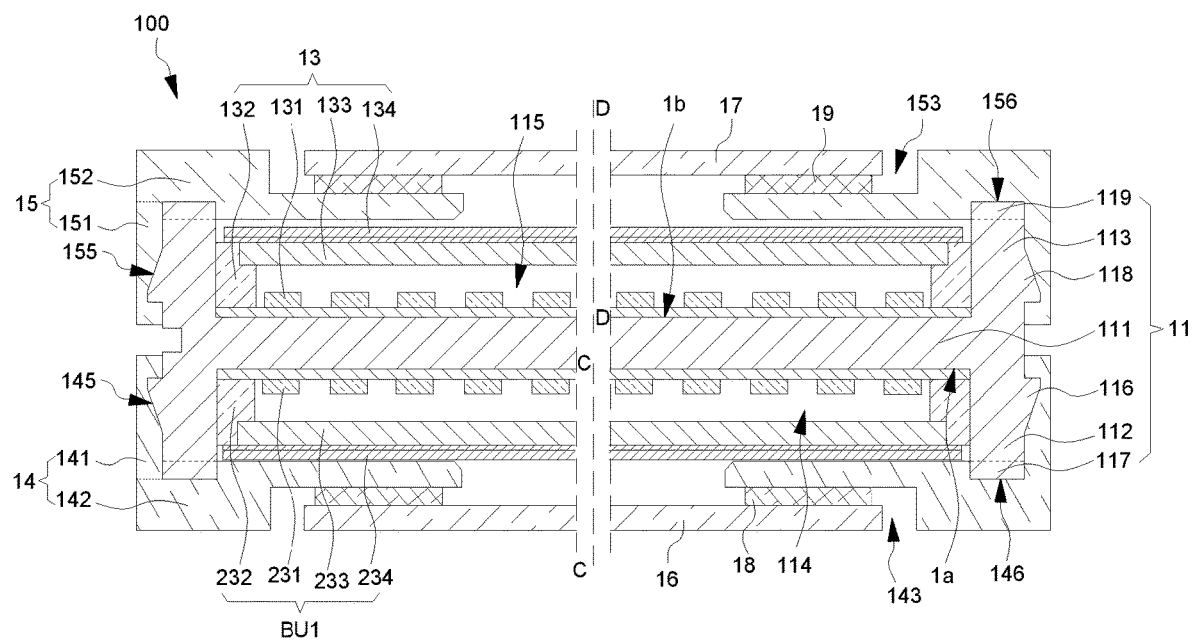
FIG. 10 is another schematic structural view of a display module of a display system provided by an embodiment of the present application.

Please refer to FIG. 10. Alternatively, on the basis of the foregoing embodiment, this embodiment replaces the edge-lit first backlight module 12 in the foregoing embodiment with a direct-type first backlight module BU1.

Specifically, the first backlight module BU1 includes an LED light board 231, a holding member 232, a diffuser plate 233, and a first optical film 234.

The LED light board 231 is disposed on the first surface 1a. The holding member 232 is disposed on a peripheral side of the LED light board 231. An accommodation groove 235 is defined on a side of the holding member 232 away from the first surface 1a. The diffuser plate 233 is disposed on a light output side of the LED light board 231, wherein part of the diffuser plate 233 is located in the accommodation groove 235. The first optical film 234 is disposed on a side of the diffuser plate 233 away from the backplane 111.

Correspondingly, an embodiment of the present application further provides a display module, and the display module is the display module 100 of the display system 1000 of the above-mentioned embodiment as shown in FIG. 2 to FIG. 10.

Since the structure of the display module of this embodiment is the same as the structure of the display module 100 of the display system 1000 of the above embodiment, it will not be repeated in this embodiment. For details, please refer to the display module 100 of the display system 1000 in the above-mentioned embodiment.

The display module and the display system provided by the embodiments of the present application are described in detail above. Specific examples are used in this article to explain the principles and implementation of this application. The descriptions of the above embodiments are only used to help understand the technical solutions and core ideas of this application. Also, for those skilled in the art, according to the idea of this application, there will be changes in the specific implementation and application scope. In summary, the content of this application should not be construed as a limitation on this application.

What is claimed is:

1. A display module, comprising:
a back frame comprising a backplane, a first side wall, and a second side wall, wherein the backplane comprises a first surface and a second surface disposed opposite to each other, the first side wall is disposed on the first surface and located on a peripheral side of the backplane, the second side wall is disposed on the second surface and located on the peripheral side of the backplane, the first side wall and the backplane collectively form a first groove, and the second side wall and the backplane collectively form a second groove;
a first backlight module disposed in the first groove, wherein the first backlight module comprises a reflective sheet, a light guide plate, a first optical film, and a light source, wherein the reflective sheet is disposed on the first surface, the light guide plate is disposed on a side of the reflective sheet away from the first surface, the first optical film is disposed on a light output surface defined on the light guide plate, and the light source is arranged on the first side wall facing a light input surface defined on the light guide plate;
a second backlight module disposed in the second groove;
a first frame disposed on a side of the first side wall away from the backplane, wherein the first frame comprises a third side wall and a first support portion, the third side wall is mounted on an outer peripheral surface of the first side wall, and the first support portion extends from the third side wall in a direction from the first side wall to a center line of the first groove;
a second frame disposed on a side of the second side wall away from the backplane;
a first liquid crystal panel provided on a side of the first frame away from the backplane; and
a second liquid crystal panel provided on a side of the second frame away from the backplane;
wherein a third groove is defined on a side of the first support portion away from the backplane, and the first liquid crystal panel is disposed in the third groove;
wherein the first side wall comprises a corner portion having a first notch, and the first optical film comprises a first optical film body and a first positioning portion connected to a corner of the first optical film body, wherein the first optical film body is disposed in the first groove, and the first positioning portion passes through and is engaged with the first notch.

2. The display module of claim 1, further comprising a first light-shielding adhesive disposed in the third groove and located between the first support portion and the first liquid crystal panel.

3. The display module of claim 1, wherein the first notch has an opening area gradually increasing from a side of the first notch close to the first groove to a side of the first notch away from the first groove, and the first positioning portion has a width gradually increasing from a side of the first positioning portion connected to the first optical film body to a side of the first positioning portion away from the first optical film body, so that the first positioning portion is engaged with the first notch.

4. The display module of claim 1, wherein a first engaging portion is arranged on an outer peripheral side of the first side wall, a first engaging recess is defined on the third side wall, and the first engaging portion engages with the first engaging recess.

5. The display module of claim 1, wherein a first insertion portion is disposed on a side of the first side wall facing the first support portion, a first insertion slot is defined on the first support portion, and the first insertion portion is inserted in the first insertion slot.

6. The display module of claim 1, wherein the second frame comprises a fourth side wall and a second support portion, the fourth side wall is mounted on an outer peripheral surface of the second side wall, and the second support portion extends from the fourth side wall in a direction from the second side wall to a center line of the second groove;
wherein a fourth groove is defined on a side of the second support portion away from the backplane, and the second liquid crystal panel is disposed in the fourth groove.

7. The display module of claim 1, wherein the second backlight module comprises a light-emitting diode (LED) light board, a holding member, a diffuser plate, and a second optical film;
wherein the LED light board is disposed on the second surface, the holding member is disposed on a peripheral side of the LED light board, a fifth groove is defined on a side of the holding member away from the second surface, and the diffuser plate is disposed on a light output side of the LED light board, wherein part of the diffuser plate is located in the fifth groove, and the second optical film is disposed on a side of the diffuser plate away from the backplane.

8. The display module of claim 1, wherein the first frame and the second frame are spaced apart by a spacing.

9. A display system, comprising a display module, a projection component, and a projection bearing component;
wherein the display module comprises:
a back frame comprising a backplane, a first side wall, and a second side wall, wherein the backplane comprises a first surface and a second surface disposed opposite to each other, the first side wall is disposed on the first surface and located on a peripheral side of the backplane, the second side wall is disposed on the second surface and located on the peripheral side of the backplane, the first side wall and the backplane collectively form a first groove, and the second side wall and the backplane collectively form a second groove;
a first backlight module disposed in the first groove;
a second backlight module disposed in the second groove;
a first frame disposed on a side of the first side wall away from the backplane;
a second frame disposed on a side of the second side wall away from the backplane;
a first liquid crystal panel provided on a side of the first frame away from the backplane; and
a second liquid crystal panel provided on a side of the second frame away from the backplane;
wherein the projection component is disposed with respect to a display side defined by the second liquid crystal panel, the projection bearing component is disposed with respect to a light output side defined by the projection component, and the projection component is configured to project a display image of the second liquid crystal panel onto the projection bearing component.

10. The display system of claim 9, wherein a display surface defined on the second liquid crystal panel is located at an angle with respect to a plane on which the projection component is situated, wherein the angle is an acute angle.

11. The display system of claim 10, wherein the projection component comprises a reflective surface being concave curved in shape.

12. The display system of claim 9, wherein the display system is applied to an in-vehicle display, and the projection bearing component is a front windshield.

13. The display system of claim 9, wherein the first frame comprises a third side wall and a first support portion, the third side wall is mounted on an outer peripheral surface of the first side wall, and the first support portion extends from the third side wall in a direction from the first side wall to a center line of the first groove;
wherein a third groove is defined on a side of the first support portion away from the backplane, and the first liquid crystal panel is disposed in the third groove.

14. The display system of claim 13, wherein the display module further comprises a first light-shielding adhesive disposed in the third groove and located between the first support portion and the first liquid crystal panel.

15. The display system of claim 13, wherein the first backlight module comprises a reflective sheet, a light guide plate, a first optical film, and a light source;

wherein the reflective sheet is disposed on the first surface, the light guide plate is disposed on a side of the reflective sheet away from the first surface, the first optical film is disposed on a light output surface defined on the light guide plate, and the light source is arranged on the first side wall facing a light input surface defined on the light guide plate.

16. The display system of claim 15, wherein the first side wall comprises a corner portion having a first notch, and the first optical film comprises a first optical film body and a first positioning portion connected to a corner of the first optical film body;

wherein the first optical film body is disposed in the first groove, and the first positioning portion passes through and is engaged with the first notch.

17. The display system of claim 16, wherein the first notch has an opening area gradually increasing from a side of the first notch close to the first groove to a side of the first notch away from the first groove, and the first positioning portion has a width gradually increasing from a side of the first positioning portion connected to the first optical film body to a side of the first positioning portion away from the first optical film body, so that the first positioning portion is engaged with the first notch.

* * * * *